June 3, 1930.  E. A. WEEKS  1,760,926
HYDRAULIC SCRAPER STRUCTURE
Filed Nov. 28, 1928   2 Sheets-Sheet 1
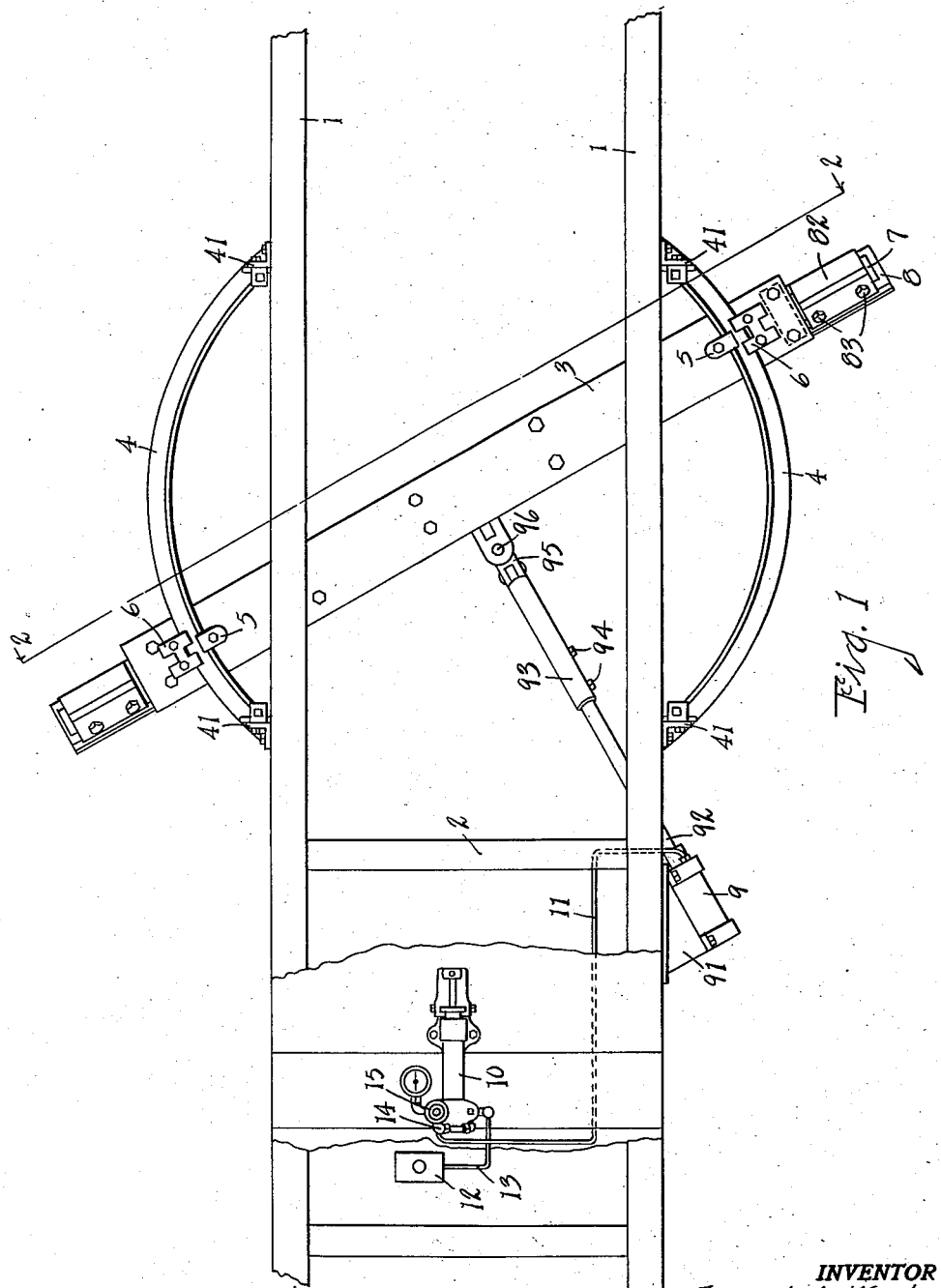
INVENTOR
Ernest A. Weeks
BY
ATTORNEYS June 3, 1930.  E. A. WEEKS  1,760,926
HYDRAULIC SCRAPER STRUCTURE
Filed Nov. 28, 1928   2 Sheets-Sheet 2
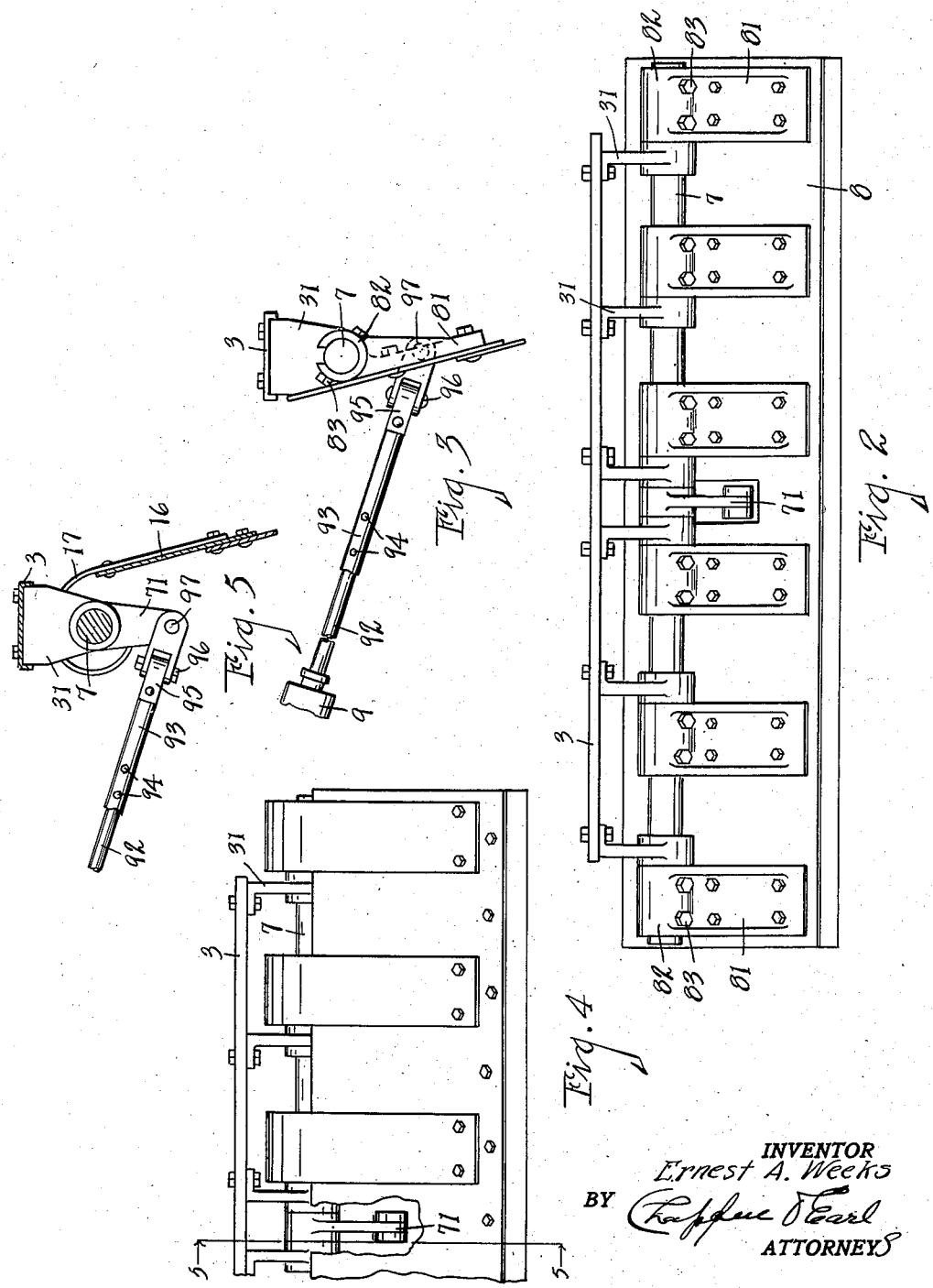
INVENTOR
Ernest A. Weeks
BY
ATTORNEYS Patented June 3, 1930

1,760,926

UNITED STATES PATENT OFFICE

ERNEST A. WEEKS, OF KALAMAZOO, MICHIGAN, ASSIGNOR TO ROOT SPRING SCRAPER COMPANY, OF KALAMAZOO, MICHIGAN

HYDRAULIC SCRAPER STRUCTURE

Application filed November 28, 1928. Serial No. 322,554.

This invention relates to an improved hydraulic scraper structure for attachment to trucks.

The objects of the invention are:

First, to provide a simple and direct connection for a hydraulic cylinder to a pivoted scraper.

Second, to provide such a structure in which the scraper is reversible.

Third, to provide such a hydraulic scraper in which the blade is very rigidly supported for planing the highway surface.

Further objects, and objects pertaining to construction and details of construction and operation of my invention will appear from the description to follow. The invention is defined and pointed out in the claims.

Preferred embodiments of my invention are illustrated in the accompanying drawings, in which:

Fig. 1 is a plan view of portions of a truck body and frame with my improved hydraulic scraper in position, portions of the cab being broken away to show details, the pipe connection being shown by dotted lines.

Fig. 2 is a rear elevational view of the rigid planing scraper taken on a line corresponding to line 2—2 of Fig. 1.

Fig. 3 is a detail end view of the scraper appearing in Fig. 2 showing the pivotal connection of the thrust bar connection.

Fig. 4 is a detail rear elevational view of the invention as applied to a spring scraper.

Fig. 5 is an enlarged detail sectional elevation on line 5—5 of Fig. 4 showing the detail pivotal connection of the thrust bar and the form and relation of the springs.

The parts will be identified by their reference numerals which are the same in all the views.

1, 1 are the side beams of a truck chassis. 2 are the cross beams, connecting the same together. 3 is the hanger board of a reversible adjustable scraper. 4, 4 are the curved side segments connected to the side rails 1 by hangers 41. The hanger board 3 is clamped to the segments by means of the clamps 5 and 6.

To the hanger board 3 are secured hanger brackets 31 and to this bracket is pivoted the scraper rockshaft 7.

The scraper 8 is carried by supporting arms 81 which are provided with collars 82 secured to the rockshaft 7 by set screws 83 so that the scraper is adjustable with the rockshaft 7. 71 is a rockshaft arm central of the said rockshaft 7.

9 is a hydraulic cylinder secured by an angle bracket 91 to the frame side 1. It is provided with a piston 92 which connects to the thrust bar 93 which is made up of telescoped sections secured together by set screws 94. This thrust bar is provided with a pivotal connection 95 having a vertical pivot 96 and a horizontal pivot 97 to make the connection universal.

The scraper blade 8 is slotted to accommodate the pivotal connection. The pivotal connection makes it possible to reverse the scraper and still accommodate the same by the hydraulic cylinder, although in the reverse position the force of the cylinder is not delivered so effectively.

A hand pump 10 is in the cab and is provided with a connecting pipe 11 to deliver the actuating fluid to the hydraulic cylinder.

12 is a supply tank with connection 13 to the hand pump. 14 is a by-pass controller by the valve 15.

In Figs. 4 and 5, a modification is shown in that there is a scraper 16 carried by C springs 17, the scraper rockshaft and its arm 71 being the same as before.

The structure of this invention is a specific embodiment of a hydraulic scraper for trucks. I desire to claim the same specifically as illustrated having presented broad claims in a copending application.

Having thus described my invention, what I claim as new and desire to secure by Letters Patent, is:

1. The combination with a truck chassis, of a scraper comprising a hanger board, a rockshaft supported thereon, a scraper with rigid arms secured to the said rockshaft, curved supporting segments at each side of the truck chassis, clamping means for securing the hanger board adjustably thereto, a hydraulic cylinder and piston, a supporting means therefor on a side beam of the said truck, thrust bar connection from the said hydraulic cylinder piston to the said rockshaft for actuating and holding the scraper to its work, and a pump on said chassis with connection to supply fluid under pressure to actuate said hydraulic cylinder and hold the scraper to the ground, as specified.

2. The combination of a truck chassis, a scraper adjustably supported beneath the same, a hydraulic cylinder and piston with a support therefor on a side beam of the said chassis, a thrust bar connection from the hydraulic piston to the said scraper, and a pump on said chassis with connection to supply fluid under pressure to actuate said hydraulic cylinder and hold the scraper to the ground.

3. The combination of a truck chassis, a rigid scraper adjustably supported beneath the same, a hydraulic cylinder and piston with a support therefor on a side beam of the said chassis, a thrust bar connection from the hydraulic piston to the said scraper, and a pump on said chassis with connection to supply fluid under pressure to actuate said hydraulic cylinder and hold the scraper to the ground.

In witness whereof I have hereunto set my hand.

ERNEST A. WEEKS.